INVENTOR
De Wolf Schatzel
BY Burns, Doane + Benedict
ATTORNEYS

Feb. 27, 1951 DE WOLF SCHATZEL 2,543,603
FLUID OPERATED VARIABLE-SPEED POWER TRANSMITTING DEVICE
Filed Dec. 2, 1949 5 Sheets-Sheet 3

INVENTOR
*DeWolf Schatzel*

BY
*Burns, Doane & Benedict*
ATTORNEYS

Feb. 27, 1951 DE WOLF SCHATZEL 2,543,603
FLUID OPERATED VARIABLE-SPEED POWER TRANSMITTING DEVICE
Filed Dec. 2, 1949 5 Sheets-Sheet 4

INVENTOR
De Wolf Schatzel

BY Burns, Doane + Benedict
ATTORNEYS

Feb. 27, 1951 DE WOLF SCHATZEL 2,543,603
FLUID OPERATED VARIABLE-SPEED POWER TRANSMITTING DEVICE
Filed Dec. 2, 1949 5 Sheets-Sheet 5

INVENTOR
De Wolf Schatzel
BY
Burns, Doane + Benedict
ATTORNEYS

Patented Feb. 27, 1951

2,543,603

UNITED STATES PATENT OFFICE 2,543,603

FLUID OPERATED VARIABLE-SPEED POWER-TRANSMITTING DEVICE

De Wolf Schatzel, North Baltimore, Ohio

Application December 2, 1949, Serial No. 130,659

7 Claims. (Cl. 192—58)

The present invention relates to a fluid operated power transmitting device capable of coupling a driving member to a driven member to permit the speed ratio of the two members to be infinitely variable over a wide range and with the torque ratio varying inversely to the speed ratio. The invention is more particularly concerned with a power transmitting device of this type having characteristics which make it advantageous for use in automotive vehicles.

One of the primary objects of the invention is to provide a fluid operated power transmitting device which is simple in design and relatively inexpensive and which is capable of efficiently transmitting power from a driving member to a driven member at speed and torque ratios which are infinitely variable within the operating range of the device. A further object of the invention is to provide a fluid operated power transmitting device which exhibits the characteristics of a completely disengaged clutch when the speed ratio of the driving member to the driven member is 1:0. Another object of the invention is to provide a power transmitting device of the fluid operated infinitely variable type which is particularly efficient at or near the 1:1 speed ratio, which is the speed ratio most frequently used in automotive vehicles.

The foregoing and other objects and advantages of the invention are referred to in the following detailed description which has reference to the accompanying drawings wherein.

Figure 1:
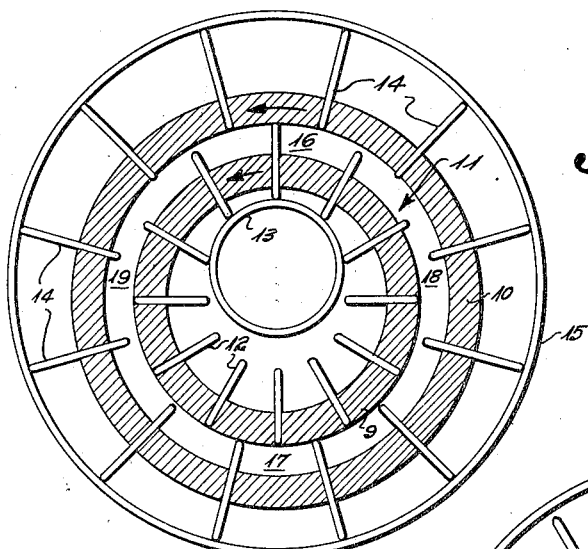
Figs. 1, 2 and 3 are diagrammatic views showing only certain essential elements of a device embodying my invention and which views are included to convey a clear understanding of the principles of operation.
Figure 2:
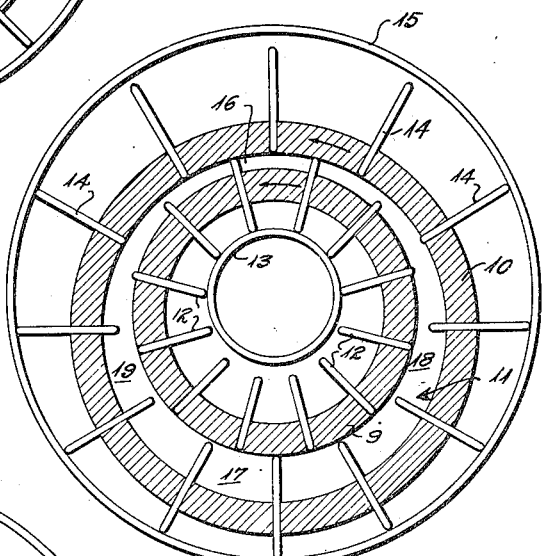
Figure 3:
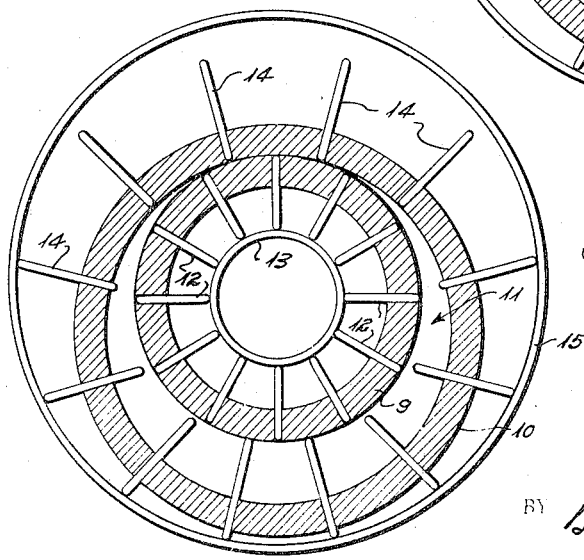
Figure 4:
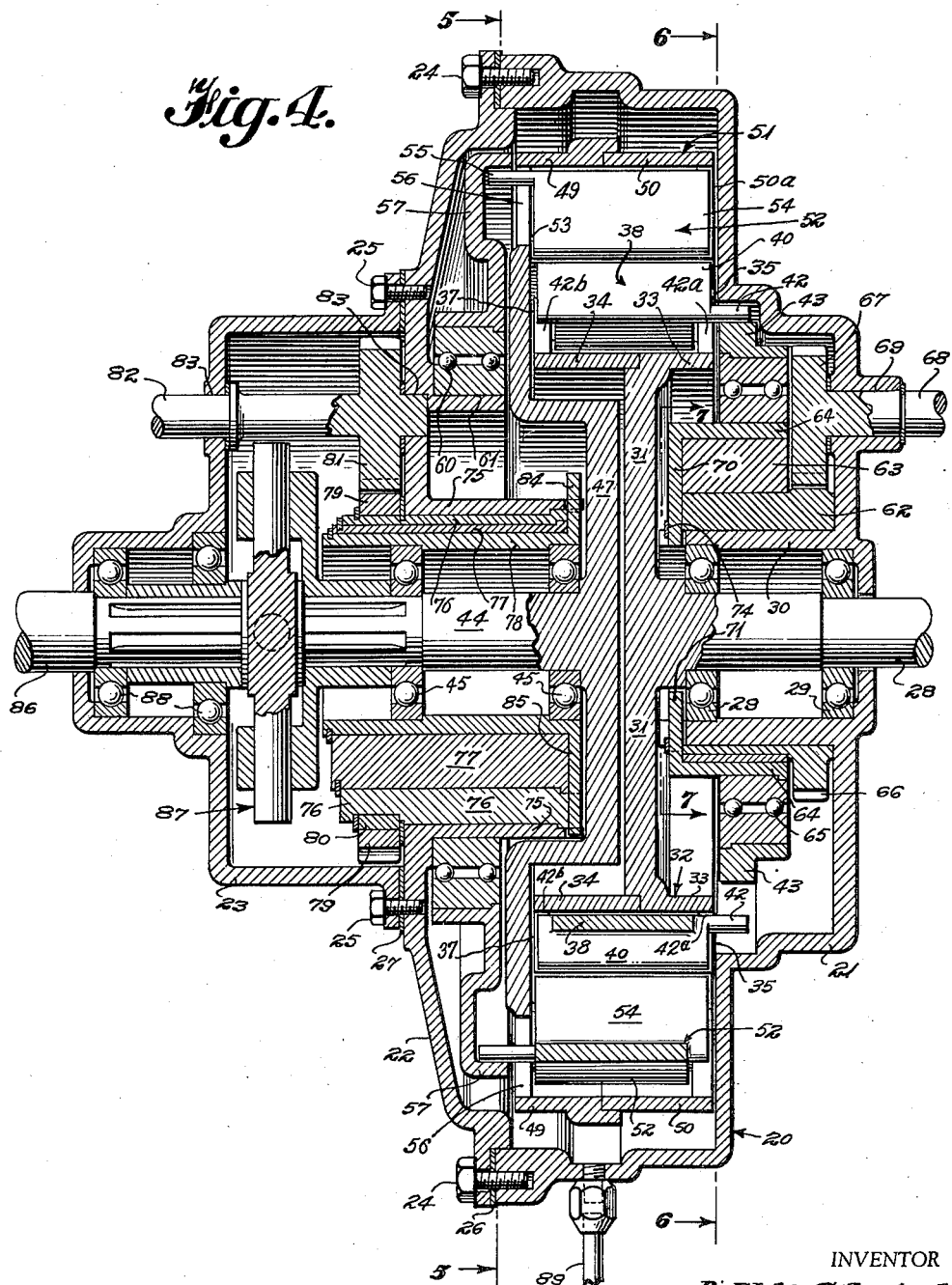
Fig. 4 is a central longitudinal sectional view of a power transmitting device embodying my invention.
Figure 5:
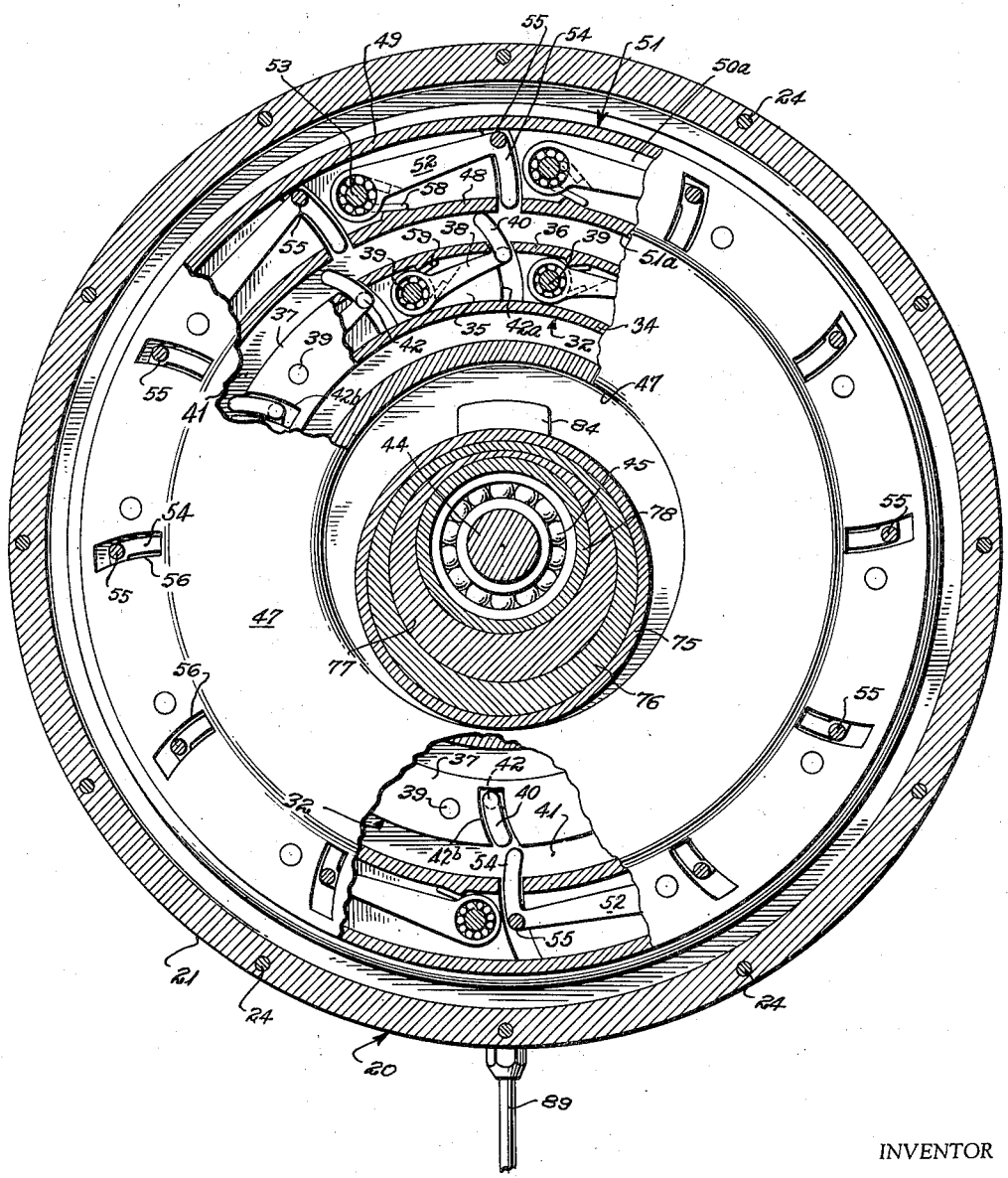
Fig. 5 is a transverse sectional view taken in the direction of the arrows along the line 5—5 of Fig. 4 with portions of the structure shown broken away for clearer illustration of certain details.

The principles of operation of the device can best be understood by reference to Figs. 1 to 3 which diagrammatically illustrate certain essential features of the device in three representative operating conditions. An inner rotor 9 may be considered as rigidly connected to a driving shaft. An outer rotor 10 surrounds the inner rotor 9 and may be considered as flexibly connected to a driven shaft. The inner and outer rotors are shown in concentric relationship in Fig. 1 and they define the inner and outer walls of a fluid filled working chamber which is designated generally by the reference numeral 11. The inner rotor carries a plurality of radially extending vanes 12. The vanes 12 may be biased inwardly by any suitable means such as springs so that in their innermost positions their outer ends are essentially flush with the outer surface of the inner rotor 9. The inner vanes 12 are arranged to be projected into the working chamber 11 by means of an inner cylindrical cam 13. The outer rotor 10 also carries radially extending vanes 14 which may be biased outwardly by any suitable means such as springs so that in their outermost positions their inner ends are essentially flush with the inner surface of the outer rotor 10. The outer vanes 14 are arranged to be projected into the working chamber 11 by an outer cylindrical cam 15.

The inner rotor 9 has been assumed to be the driving member and it will be further assumed that this rotor is rotating counterclockwise, as indicated by the arrow. As shown in Fig. 1, the inner cam 13 projects the inner vanes 12 into the portion of the working chamber 11 which is designated by the reference numeral 16, causing the inner vanes 12 to closely approach the inner surface of the outer rotor in that portion of the working chamber. The outer cam 15 projects the outer vanes 14 into the diametrically opposite portion of the working chamber 11, which is designated by the reference numeral 17, causing the outer vanes 14 to closely approach the outer surface of the inner rotor 9 in the portion 17 of the working chamber. Rotation of the inner rotor 9 and its associated inner vanes 12 will pump fluid from that portion of the working chamber which is designated by the reference numeral 18 and discharge such fluid into the portion of the working chamber which is designated by the reference numeral 19. The portion 18 of the working chamber will therefore be a region of low fluid pressure and the portion 19 of the working chamber will be a region of high fluid pressure. The outer vanes 14, which project into the portion 17 of the working chamber, will therefore be exposed to high pressure on one face and to low pressure on the opposite face. This will cause rotation of the outer rotor 10 in a counterclockwise direction as indicated by the arrow. The positions of the various elements in Fig. 1 are such that the working chamber 11 is annular and of uniform cross section throughout its circumference. The exposed area of the inner vanes 12 in the portion 16 of the working chamber is equal to the exposed area of the outer vanes 14 in the portion 17 of the working chamber and it therefore follows that the rotors 9 and 10 will rotate with substantially the same angular velocity and that their shafts will experience substantially the same torque. The arrangement illustrated in Fig. 1 thus gives substantially a 1:1 speed ratio. It will be seen that under these conditions the speed ratio will also be substantially 1:1 if the outer rotor 10 is made the driving member.

In Fig. 2 the outer rotor 10 and the inner cam 13 have been lowered by equal distances relative to the inner rotor 9 and the outer cam 15. The inner rotor 9 is still rotating counterclockwise as indicated by the arrow and the inner vanes 12 will continue to pump fluid from the portion 18 of the working chamber 11 to the portion 19 thereof. However, the inner vanes 12 now project only a short distance into the working chamber 11. The exposed area of the outer vanes 14 in the portion 17 of the working chamber is approximately three times as great as the exposed area of the inner vanes 12 in the portion 16 of working chamber and hence the outer rotor 10 will rotate in a counterclockwise direction as indicated by the arrow, but at an angular velocity approximately one-third the angular velocity of the inner rotor 9. The shaft of the outer rotor 10 will experience approximately three times the torque experienced by the shaft of the inner rotor 9. The relative positions of the elements illustrated in Fig. 2 provide a speed ratio of approximately 1:1/3 between the inner rotor 9 and the outer rotor 10. It will be apparent that if the outer rotor 10 is made the driving member in Fig. 2 and the inner rotor 9 is made the driven member, the speed ratio between driving and driven member will be approximately 3:1.

Fig. 3 illustrates the relative positions of the elements when the outer rotor 10 and the inner cam 13 have been further lowered relative to the inner rotor 9 and the outer cam 15. In this position the inner vanes 12 do not project into the working chamber 11 so the inner rotor may spin freely relative to the fluid in the working chamber. The inner rotor 9 may still be considered as the driving member but it will be apparent that no fluid will be pumped around the working chamber 11. In this condition the device operates as a completely disengaged clutch and there will be no tendency for the outer rotor 10 to rotate. Fig. 3 thus illustrates the device in condition to give a speed ratio of 1:0.

If it be assumed that the device is used in an automotive vehicle, the inner rotor 9 may be driven by the engine and the outer rotor 10 may be connected to the drive shaft leading to the differential gearing. The elements of the device will occupy the positions shown in Fig. 3 while the vehicle is at rest with the motor running. There is no drag on the motor or tendency for the vehicle to creep under these circumstances since the inner rotor 9 can rotate freely without pumping fluid. In starting the vehicle the outer rotor 10 and the inner cam 13 are slightly elevated. The inner rotor 9 will then impart a low angular velocity with high torque to the driven member 10 and the driving wheels of the vehicle. Gradual elevation of the outer rotor 10 and the inner cam 13 may be continued with gradual increase in angular velocity of the driven member until the elements occupy the positions illustrated in Fig. 1, when the speed and torque ratios will be approximately 1:1.

Figs. 1 to 3 are intended to illustrate only the principles involved in the device and reference must be had to Figs. 4 to 8 inclusive for an illustration of the structural features of an operative device.

A housing, designated generally by the reference numeral 20, consists of three cooperating sections 21, 22 and 23 which are secured together by suitable stud bolts 24 and 25 and sealed by suitable gaskets 26 and 27. A driving shaft 28 (this shaft will hereinafter be referred to as the driving shaft although, for reasons which have already been explained, this shaft may be the driven shaft) is rotatably mounted in anti-friction bearings 29 positioned in an inwardly projecting annular flange 30 on the section 21 of the housing 20. The driving shaft 28 is provided at its inner end with a disk 31 which carries the inner rotor designated generally by the reference numeral 32. The inner rotor 32 includes a peripheral flange 33, which may be integral with the disk 31, and a ring 34. The flange 33 carries a radially extending side wall 35 and an outer wall which forms one-half of the outer wall 36 of the inner rotor. The ring 34 is similarly provided with a side wall 37 which carries an outer wall which forms the remaining one-half of the outer surface 36 of the rotor 32.

The inner rotor 32 carries inner vanes 38 which are pivotally mounted on bolts 39 which secure the two sections of the rotor together. The vanes 38 have projecting portions 40 which project at times into the working chamber 41. The portions 40 of the vanes 38 project through arcuate slots 42a and 42b in the side walls 35 and 37 respectively of the inner rotor 32. The vanes 38 are also provided with cam follower pins 42 which extend into positions for appropriate engagement with the inner cam 43.

The driven shaft 44 is rotatably mounted in anti-friction bearings 45 carried by an outer rotor bearing sleeve 78 described in greater detail hereinafter. The driven shaft 44 is provided with a disk 47 which carries near its periphery axially extending flanges 48 and 49. The flange 48 forms one-half of the inner wall 51a of the outer rotor. A ring 50 cooperates with the flange 49 to form the outer surface of the outer rotor, which is designated in its entirety by the reference numeral 51. The ring 50 carries a radially inwardly extending side wall 50a and an inner wall which forms the remaining one-half of the inner surface 51a of the rotor 51. The working chamber 41 is defined by the outer surface 36 of the inner rotor, the inner surface 51a of the outer rotor, the disk 47 of the outer rotor and the section 21 of the housing 20.

The outer rotor 51 is provided with outer vanes 52 which are pivotally mounted on bolts 53, which secure the two sections of the rotor together. The vanes 52 are provided with portions 54 which can be projected into the working chamber 41. The outer vanes 52 are also provided with cam follower pins 55 which project through arcuate slots 56 in the disk 47 into positions for appropriate engagement with the outer cam 57.

The inner vanes 38 are preferably mounted on the bolts 39 with anti-friction bearings such as needle bearings, and the outer vanes are preferably mounted on the bolts 53 by similar needle bearings. The outer vanes 52 may be biased outwardly by means of coil springs 58. The inner vanes 38 may be biased inwardly by means of similar coil springs 59.

It will thus be seen that the inner rotor 32 and the driving shaft 28 have an axis of rotation which is fixed relative to the housing 20. The outer cam 57 is rotatably mounted on anti-friction bearings 60 which in turn are mounted on an inwardly extending flange 61 which is integral with the section 22 of the housing 20. The outer cam 57 thus also has an axis of rotation which is fixed relative to the housing.

Figure 6:
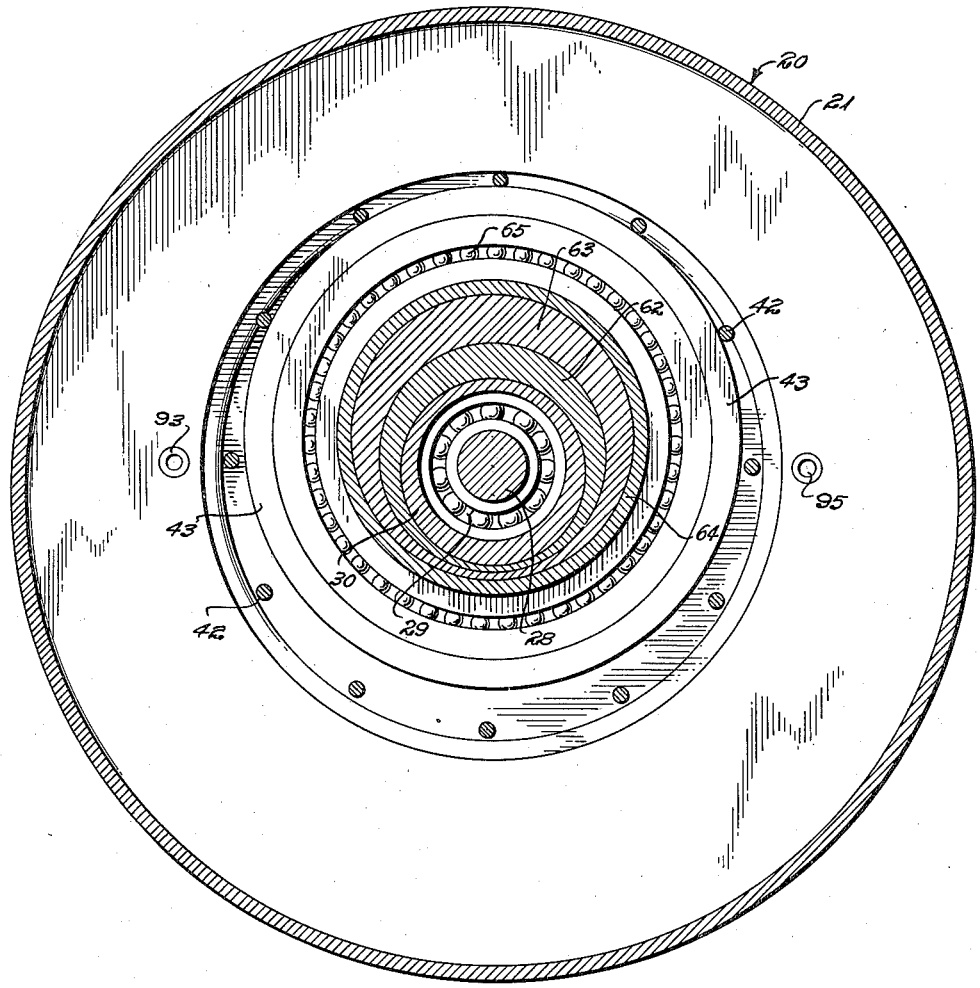
Fig. 6 is a transverse sectional view taken in the direction of the arrows along the line 6—6 of Fig. 4.
Figure 7:
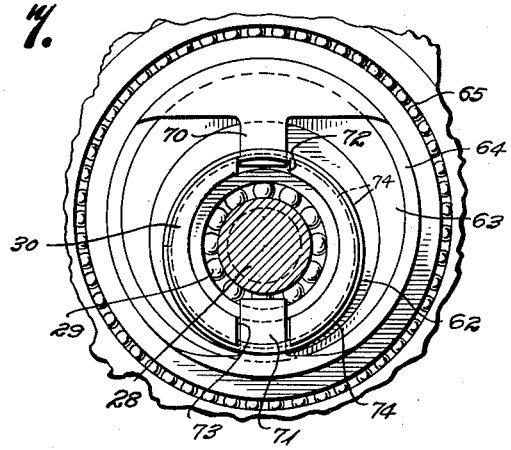
Fig. 7 is a transverse sectional view taken in the direction of the arrows along the line 7—7 of Fig. 4.
Figure 8:
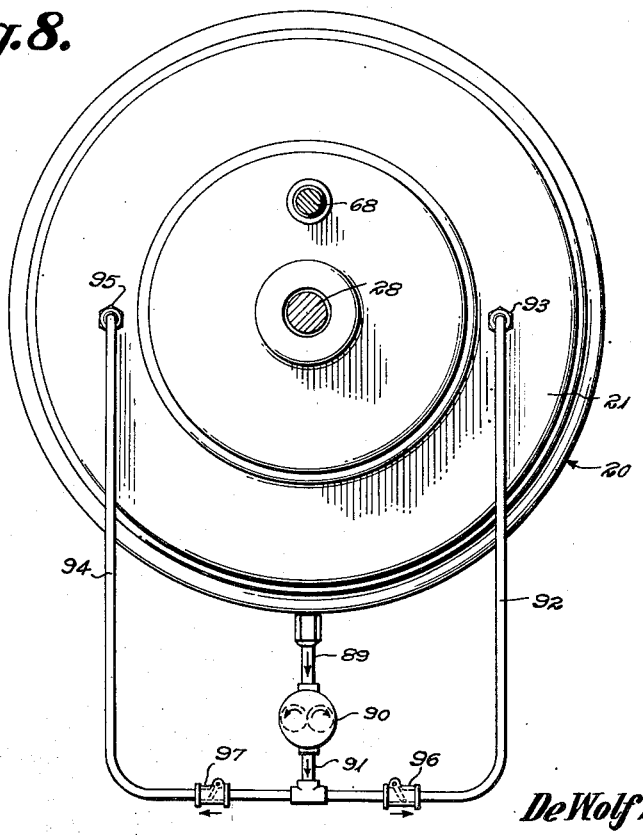
Fig. 8 is an end elevation view of the device.

The inner cam 43 and the outer rotor 51 have axes of rotation which are concurrently movable by equal distances in the same direction to provide the adjustments discussed above in connection with the descriptions of Figs. 1 to 3. The outer surface of the fixed flange 30 on the section 21 of the housing is slightly eccentric to the driving shaft 28, as is best illustrated in Fig. 6. A control sleeve 62 surrounds the flange 30 and this control sleeve is also eccentric. An eccentric floating sleeve 63 surrounds the control sleeve 62 and an inner cam sleeve 64 surrounds the floating sleeve 63. An anti-friction bearing 65 is mounted on the outer surface of the inner cam sleeve 64 and the outer race of this anti-friction bearing carries the inner cam 43 in such manner that the inner cam is freely rotatable relative to the flange and sleeves just described. The control sleeve 62 carries an external gear 66 which is concentric to the outer surface of the flange 30. The gear 66 meshes with a pinion 67 on a shaft 68 which is journaled in the housing 20 at 69. The inner cam sleeve 64 carries lugs 70 and 71 which extend radially inwardly and are received respectively in notches 72 and 73 in the inner end of the fixed flange 30. A suitable keeper ring 74 serves to prevent relative axial movement of the assembly relative to the flange 30. The lugs 70 and 71 thus prevent rotation of the inner cam sleeve 64 relative to the flange 30, and prevent the inner cam sleeve 64 from moving in any but a vertical direction.

It will be apparent from the foregoing description that rotation of the shaft 68 will cause rotation of the control sleeve 62. The control sleeve 62 cooperates with the fixed flange 30 and the floating sleeve 63 to elevate or lower the inner cam 43 as that cam is viewed in Fig. 4. This assembly provides a firm support for the inner cam 43 and yet permits precise positioning of that cam.

An arrangement somewhat similar to the one just described is provided for positioning the outer rotor 51, which is concentric to the driven shaft 44. An inwardly extending flange 75 is secured to the section 22 of the housing 20. An eccentric control sleeve 76 is rotatable within the flange 75 and an eccentric floating sleeve 77 is rotatable within the control sleeve 76. The outer rotor bearing sleeve 78 is carried by and within the floating sleeve 77 and the outer races of the anti-friction bearings 45 are positioned within the bearing sleeve 78. The control sleeve 76 is provided with an external gear 79 which may be secured thereto by any suitable means such as a key 80. The gear 79 meshes with a pinion 81 on a shaft 82 which is journa'ed in the housing 20 at 83. The outer rotor bearing sleeve 78 carries outwardly extending lugs 84 and 85 which are received in notches in the inner end of the flange 75. The outer rotor bearing sleeve is thus prevented from rotating and is prevented from moving in any but a vertical direction. Suitable keeper rings are illustrated to prevent relative axial movement of the elements of this assembly.

It will be apparent that rotation of the shaft 82 will cause rotation of the control sleeve 76 which will cooperate with the floating sleeve 77 and the fixed flange 75 to elevate or lower the outer bearing sleeve 78, the driven shaft 44, and the outer rotor 51.

The driven shaft 44 is shown connected to an output shaft 86 by means of a double yoke arrangement 87, although any other suitable mechanism for permitting disalignment of the shafts 44 and 86 may be used. The output shaft 86 is mounted in anti-friction bearings 88 in the section 23 of the housing.

The assemblies for elevating and lowering the inner cam 43 and the outer rotor 51 are preferably so proportioned that equal angular movement of the shafts 68 and 82 will result in equal elevating or lowering movement of the inner cam and outer rotor. Figs. 4 to 7 illustrate the elements of the device in positions corresponding to the adjustment shown in Fig. 1. Rotation of the control sleeves 62 and 76 through 180° will position the elements to correspond to the adjustment shown in Fig. 3. The control shafts 68 and 82 may have their angular positions concurrently controlled by any suitable manual or automatic means, such as a common shift collar, not shown.

The working chamber 41 is the only portion of the device which will normally be filled with fluid. The drawings illustrate clearances somewhat greater than is either necessary or desirable, but it is inevitable that there will be some leakage of fluid from the working chamber. The fluid which escapes from the working chamber will flow to the lower portion of the housing 20 where it is discharged through a tubing 89 leading to the inlet of any suitable pump such as a gear pump 90. The outlet 91 of the pump 90 is provided with a passage 92 which leads to an opening 93 in the housing and which communicates with the working chamber 41. The outlet of the pump 90 is also provided with a passage 94 which leads to an opening 95 in the housing and which communicates with the working chamber 41 at a point diametrically opposite the opening 93. The passage 92 is provided with a check valve 96 to prevent flow of fluid from the working chamber through the passage 92 and the passage 94 is provided with a similar check valve 97 to prevent escape of fluid from the working chamber through the passage 94. The pump 90 can thus withdraw fluid from the lower portion of the housing 20 and deliver the fluid to that portion of the working chamber which is at the lower pressure. The two passages 92 and 94 are necessary because of the reversible character of the device and because the position of the zone of lower pressure within the working chamber depends on the direction of rotation of the inner rotor and the direction of power flow through the device.

I have illustrated and described the inner and outer vanes as being spring biased toward positions in which they do not project into the working chamber, as being limited in their movement in such a way that at no time do they move away from the working chamber a distance greater than that necessary for them to clear the working chamber, and as being projected into the working chamber by their respective cylindrical cams. It will be obvious, however, that the vanes can be biased toward positions in which they project into the working chamber, that they can then be retracted from the working chamber by their respective cams, and that they can be retracted more than the amount necessary to clear the working chamber. It will also be obvious that centrifugal force acting on the vanes or on counterweights suitably attached to the vanes may be utilized to supplement or substantially replace spring biasing. It will further be obvious that the cams may be so constructed that they will effect both the projection and retraction of the vanes, thereby eliminating the need for biasing. It will still further be obvious that each cylindrical rotating cam may be replaced by a suitably shaped fixed cam or a plurality of cylindrical rotating cams which will cause the projecting end of each vane to follow a path of the same radius of curvature as the surface of the opposing rotor during the period in which that vane is passing through its region of maximum projection, thereby reducing the leakage past that vane.

The device is illustrated in Figs. 4 to 7 with the various elements in appropriate positions to provide a substantially 1:1 speed ratio between the driving shaft 28 and the driven shaft 44 or the output shaft 86. It will be noted that the driving shaft 28, the driven shaft 44 and the output shaft 86 are all in axial alignment. Under these conditions the double yoke 87 functions merely as a connection between the aligned shafts 44 and 86 and there is no appreciable wear on the yoke.

It will be seen that the cam follower pins 42 and 55 on the inner and outer vanes approach and recede from their respective cams at very slight angles. This contributes to gentle cam action which eliminates wear and strain and reduces noise to a minimum, which is desirable in automotive vehicles. The inner and outer cams are freely rotatable and these cams will rotate at the approximate average speed of the rotors with which they cooperate. This rotation of the cams is caused by the wiping action of the cam follower pins attached to the vanes. Wear and friction losses due to the camming action are thus virtually eliminated.

I have illustrated and described what I now consider to be the preferred form of my invention. It is to be understood, however, that various alterations and modifications may be resorted to without departing from the broader scope of the invention, as defined by the following claims.

Having thus described my invention, I claim:

1. A fluid operated power transmitting device comprising an inner rotor, an outer rotor surrounding said inner rotor and providing a ring shaped working chamber between the rotors, inner vanes movably secured to said inner rotor and projectable into said working chamber, outer vanes movably secured to said outer rotor and projectable into said working chamber, an inner cam controlling the projection of said inner vanes into said working chamber, an outer cam controlling the projection of said outer vanes into said working chamber, and means for concurrently moving said outer rotor and said inner cam transversely relative to said outer cam and said inner rotor to increase the radial dimension of said working chamber for a portion of its circumferential length and to decrease the radial dimension of said working chamber for the remainder of its circumferential length.

2. A fluid operated power transmitting device comprising an inner rotor, an outer rotor surrounding said inner rotor and forming therewith a generally ring shaped fluid working chamber, a plurality of inner vanes carried by said inner rotor and projectable into said chamber, a plurality of outer vanes carried by said outer rotor and projectable into said chamber, a first cam projecting said inner vanes into said chamber around a portion of the circumference of the chamber, a second cam projecting said outer vanes into said chamber around another portion of the circumference of said chamber, and means for moving the axes of rotation of said inner and outer rotors out of alignment and for controlling the extent of eccentricity of said rotors.

3. A fluid operated power transmitting device comprising an inner rotor, an outer rotor surrounding said inner rotor and defining with said inner rotor a generally ring shaped fluid working chamber, means for relatively moving the axes of rotation of said rotors from coincidence to positions in which the rotors are eccentric, outer vanes carried by said outer rotor and projectable into said chamber, inner vanes carried by said inner rotor and projectable into said chamber, means for projecting said inner vanes into said chamber around a portion of said chamber, and means for projecting said outer vanes into said chamber around another portion of said chamber.

4. A fluid operated power transmitting device comprising an inner rotor, an outer rotor surrounding said inner rotor and defining therewith a generally ring shaped fluid working chamber between said inner and outer rotors, a driving shaft connected to one of said rotors, a driven shaft connected to the other of said rotors, means for moving one of said shafts relative to the other of said shafts from positions of axial alignment to positions in which said rotors are eccentric, inner vanes carried by said inner rotor, a first cam projecting said inner vanes into said working chamber around a portion of its circumferential length, outer vanes carried by said outer rotor, a second cam projecting said outer vanes into said working chamber around another portion of its circumferential length whereby rotation of said driving shaft and its associated rotor and vanes will pump fluid circumferentially around said working chamber and such pumped fluid will act on the vanes carried by the other of said rotors to cause rotation of such other rotor and said driven shaft at an angular velocity related to the extent of eccentricity of said rotors.

5. A fluid operated power transmitting device as defined by claim 4 in which said driving shaft is connected to said inner rotor and said first cam is adjustable to a position in which said inner vanes are not projected into said working chamber whereby pumping of fluid around said working chamber ceases and whereupon said device exhibits the characteristics of a disengaged clutch.

6. A fluid operated power transmitting device as defined by claim 4 in which said first and second cams are so positioned that said inner and outer vanes project equal distances into said working chamber while said shafts are in axial alignment and said rotors are concentric.

7. A fluid operated power transmitting device comprising an inner rotor, an outer rotor surrounding said inner rotor and defining with said inner rotor a generally ring shaped fluid working chamber, means for relatively moving the axes of rotation of said rotors from coincidence to positions in which the rotors are eccentric, outer vanes carried by said outer rotor and projectable into said chamber, inner vanes carried by said inner rotor and projectable into said chamber, means for projecting said inner vanes into said chamber and closely adjacent said outer rotor around a portion of said chamber, and means for projecting said outer vanes into said chamber and closely adjacent said inner rotor around another portion of said chamber.

DE WOLF SCHATZEL.

REFERENCES CITED

The following references are of record in the file of this patent:

UNITED STATES PATENTS

| Number | Name | Date |
|---|---|---|
| 933,232 | De Coligny | Sept. 7, 1909 |
| 933,233 | De Coligny | Sept. 7, 1909 |
| 1,093,172 | Collins | Apr. 14, 1914 |
| 2,236,556 | Wunderle | Apr. 1, 1941 |